(12) United States Patent
Hirosue et al.

(10) Patent No.: US 11,407,272 B2
(45) Date of Patent: Aug. 9, 2022

(54) BLOWER APPARATUS AND AUTOMOTIVE AIR CONDITIONER

(71) Applicant: Nidec Corporation, Kyoto (JP)

(72) Inventors: Satoshi Hirosue, Kyoto (JP); Shigeyuki Moriya, Kyoto (JP); Takaya Otsuki, Kyoto (JP); Yuji Saiki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 494 days.

(21) Appl. No.: 16/509,535

(22) Filed: Jul. 12, 2019

(65) Prior Publication Data
US 2020/0062075 A1 Feb. 27, 2020

(30) Foreign Application Priority Data
Aug. 24, 2018 (JP) .............................. JP2018-157119

(51) Int. Cl.
| | | |
|---|---|---|
| *F04D 29/42* | (2006.01) | |
| *B60H 1/00* | (2006.01) | |
| *F04D 15/00* | (2006.01) | |
| *F04D 17/16* | (2006.01) | |
| *B60N 2/56* | (2006.01) | |

(52) U.S. Cl.
CPC ..... *B60H 1/00471* (2013.01); *B60H 1/00285* (2013.01); *F04D 15/0066* (2013.01); *F04D 17/16* (2013.01); *F04D 29/422* (2013.01); *B60N 2/56* (2013.01)

(58) Field of Classification Search
CPC .............................. F04D 29/422; F04D 29/667
See application file for complete search history.

(56) References Cited

U.S. PATENT DOCUMENTS

| | | | | |
|---|---|---|---|---|
| 2,160,666 A | * | 5/1939 | Mcmahan | F04D 29/664 |
| | | | | 415/119 |
| 7,500,825 B2 | * | 3/2009 | Hanai | F04D 29/4233 |
| | | | | 415/204 |
| 8,747,062 B2 | | 6/2014 | Burgess et al. | |
| 9,334,875 B2 | | 5/2016 | Sato et al. | |
| 9,568,017 B2 | * | 2/2017 | Hayashi | F04D 29/661 |
| 2019/0010959 A1 | * | 1/2019 | Thawani | F04D 29/281 |

FOREIGN PATENT DOCUMENTS

| | | | |
|---|---|---|---|
| JP | 4793325 B2 | 10/2011 | |
| JP | 6077991 B2 | 2/2017 | |

* cited by examiner

*Primary Examiner* — Sabbir Hasan
(74) *Attorney, Agent, or Firm* — Keating & Bennett (57) ABSTRACT

A blower apparatus includes an impeller and a casing that accommodates the impeller. The casing includes an upper wall including an intake port, a lower wall, a side wall that includes an exhaust port, and a tongue portion connected to the upper wall. The side wall includes a first side wall, and a second side wall disposed downstream in a rotational direction of the impeller relative to the first side wall via the exhaust port. The tongue portion extends from the second side wall toward the first side wall, and includes a lower portion opposed to the lower wall. The lower portion includes a first lower portion on the base end side and a second lower portion on the tip side. A distance between the first lower portion and the lower wall is shorter than a distance between the second lower portion and the lower wall.

14 Claims, 11 Drawing Sheets

BLOWER APPARATUS AND AUTOMOTIVE AIR CONDITIONER

CROSS REFERENCE TO RELATED APPLICATION

The present invention claims priority under 35 U.S.C. § 119 to Japanese Application No. 2018-157119 filed on Aug. 24, 2018 the entire contents of which are incorporated herein by reference.

1. FIELD OF THE INVENTION

The present disclosure relates to a blower apparatus and an automotive air conditioner.

2. BACKGROUND

JP 2012-92680 A discloses a multi-blade centrifugal fan for the purpose of reducing noise. Specifically, the multi-blade centrifugal fan disclosed in JP 2012-92680 A includes an impeller and a scroll casing. The impeller is disposed in the scroll casing. The impeller is rotatably installed around the rotation axis. The scroll casing is formed by integrally connecting the upper casing and the lower casing. An air inlet is formed in the upper casing.

The scroll casing is spirally formed starting from the tongue portion. The scroll casing has an outlet. The outlet extends tangentially from the end of the spiral winding. A diffuser portion is formed at the outlet. In the diffuser portion, the flow path is drastically expanded in the up-and-down direction.

The scroll casing has an upper end surface and a lower end surface. An outer peripheral portion of the scroll casing is formed with an extended portion which is extended in the rotation axis direction. The lower end surface of the extended portion is an inclined end surface in which the extension height gradually increases in the rotational direction from the winding start of the scroll casing. A step portion is provided between the inclined end surface and the inner peripheral side surface of the extended portion. The height and the width of the step portion sequentially increase in the rotational direction from the inclination start position of the inclined end surface toward the front position of the tongue portion. JP 2012-92680 A discloses that the step portion is provided between the inclined end surface and the inner peripheral side surface of the extended portion, whereby interference between the air flow blown out from the impeller and the swirling flow (vortex flow) formed in the extended portion can be suppressed, whereby noise can be reduced.

However, the multi-blade centrifugal fan disclosed in JP 2012-92680 A cannot suppress a turbulent flow in the vicinity of the exhaust port.

SUMMARY

Example embodiments of the present disclosure provide a blower apparatus and an automotive air conditioner each capable of achieving noise reduction while reducing or preventing a decrease in the air volume by reducing or preventing a turbulent flow in a vicinity of an exhaust port.

An example embodiment of a blower apparatus of the present disclosure includes an impeller rotatable about a center axis that extends in an up-and-down direction, a motor that rotates the impeller, and a casing that accommodates the impeller. The casing includes an upper wall including an intake port that opens in an axial direction, a lower wall opposed to the upper wall in the axial direction, a side wall that connects the upper wall and the lower wall and includes an exhaust port that opens in a cross direction crossing the axial direction, and a tongue portion connected to the upper wall. The side wall includes a first side wall, and a second side wall disposed downstream in the rotational direction of the impeller relative to the first side wall via the exhaust port. The tongue portion extends from the second side wall toward the first side wall, and includes a lower portion opposed to the lower wall. The lower portion includes a first lower portion on the base end side and a second lower portion on the tip side. A distance between the first lower portion and the lower wall is shorter than a distance between the second lower portion and the lower wall.

An automotive air conditioner according to an example embodiment of the present disclosure includes the blower apparatus described above.

According to the example embodiments of the present disclosure, by reducing or preventing a turbulent flow in a vicinity of the exhaust port, it is possible to reduce or prevent noise while reducing or preventing a decrease in the air volume.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. However, the present disclosure is not limited to the following example embodiments. In the drawings, the same or corresponding portions are denoted by the same reference characters and description thereof will not be repeated. In addition, the description may be omitted as appropriate for parts where the description overlaps.

In this specification, for the sake of convenience, the direction in which a center axis AX (see FIG. 1) of a motor extends is described as an up-and-down direction. However, the up-and-down direction is defined for the convenience of description, and the direction of the center axis AX is not intended to coincide with the vertical direction. Moreover, in the present specification, a direction parallel to the center axis AX of the motor is described as "axial direction DA", and a radial direction and a circumferential direction centering on the center axis AX of the motor are described as "radial direction DR" and "circumferential direction DC". However, these definitions do not intend to limit the orientation during use of the motor according to the present disclosure. The "parallel direction" includes a substantially parallel direction, and the "orthogonal direction" includes a substantially orthogonal direction.

First Example Embodiment

Figure 1:
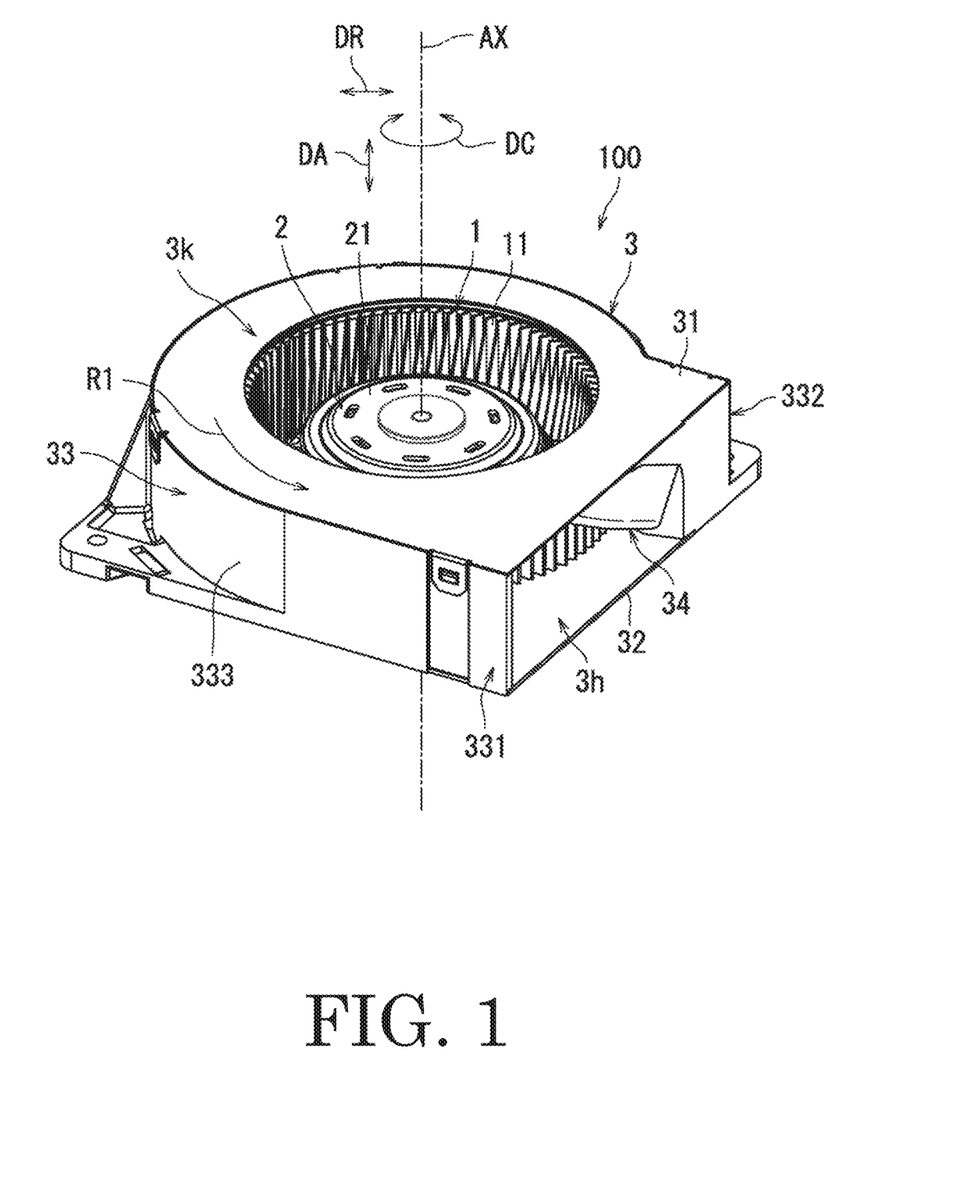
FIG. 1 is a perspective view showing a configuration of a blower apparatus according to a first example embodiment of the present disclosure.
Figure 2:
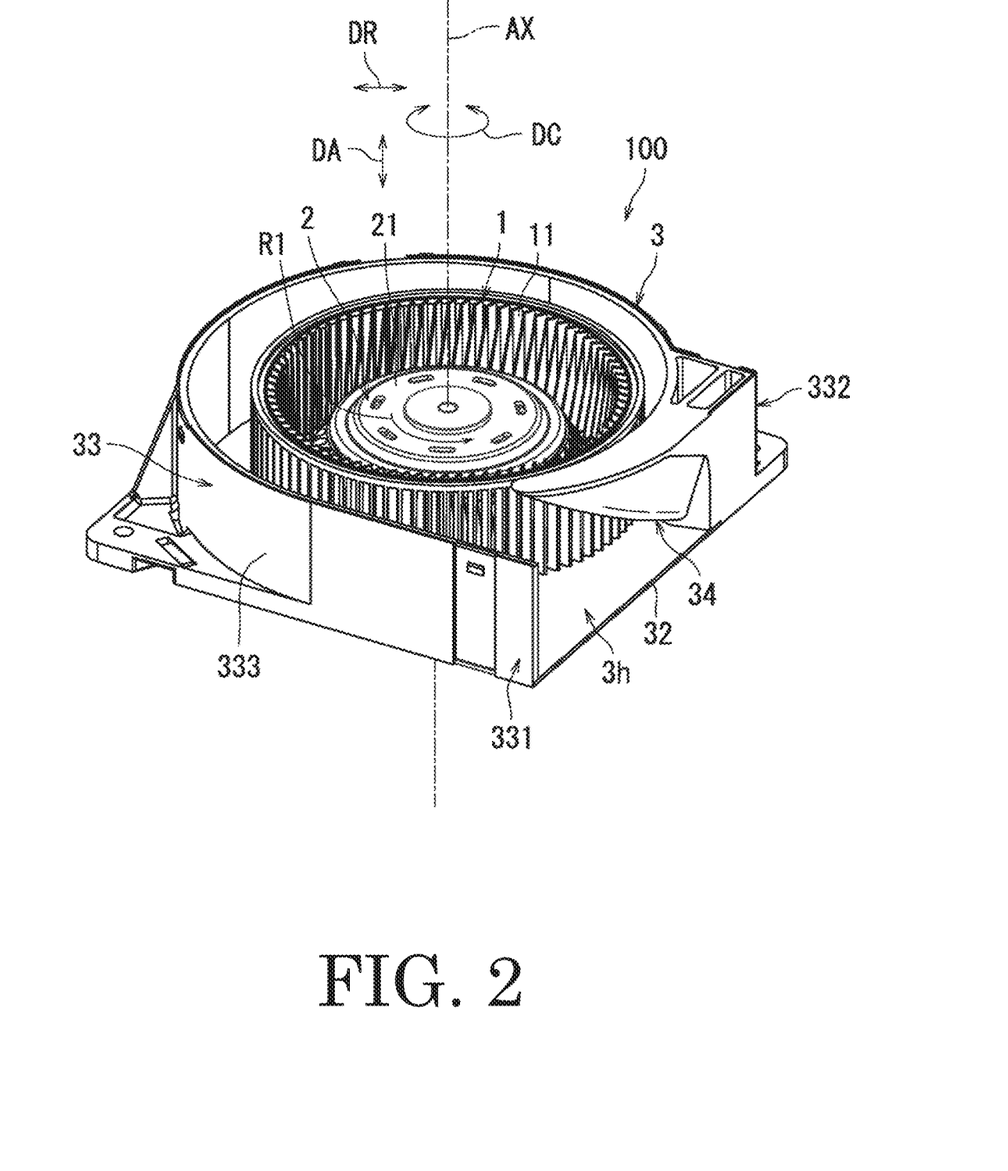
FIG. 2 is a perspective view showing the configuration of the blower apparatus, shown in FIG. 1, in which an upper wall is removed.

First, with reference to FIGS. 1 and 2, a configuration of a blower apparatus 100 according to a first example embodiment of the present disclosure will be described. FIG. 1 is a perspective view showing a configuration of the blower apparatus 100 according to the first example embodiment of the present disclosure. FIG. 2 is a perspective view showing the configuration of the blower apparatus 100, shown in FIG. 1, in which an upper wall 31 is removed.

As shown in FIGS. 1 and 2, the blower apparatus 100 includes an impeller 1, a motor 2, and a casing 3. In the present example embodiment, the blower apparatus 100 is a centrifugal fan such as a turbo fan, for example.

The impeller 1 is rotatable about the center axis AX extending in the up-and-down direction. The impeller 1 has a plurality of blades 11.

The motor 2 rotates the impeller 1. Specifically, the motor 2 has a general motor configuration. The motor 2 has a stator and a circuit board, for example. The circuit board controls electric power supplied to the stator. The motor 2 also includes a rotor 21. The rotor 21 rotates about the center axis AX with the electric power supplied to the stator. The impeller 1 is fixed to the rotor 21. Accordingly, the impeller 1 rotates about the center axis AX by the rotation of the rotor 21. In the present example embodiment, the impeller 1 rotates in a rotational direction R1.

The casing 3 accommodates the impeller 1. Specifically, the casing 3 accommodates the impeller 1 and the motor 2. The casing 3 has an upper wall 31, a lower wall 32, a side wall 33, and a tongue portion 34. In the present example embodiment, the upper wall 31 is a separate member from the side wall 33 and is detachably fixed to the side wall 33. The upper wall 31 and the side wall 33 may be the same member.

The upper wall 31 has an intake port 3k that opens in the axial direction DA. When the impeller 1 rotates, air is sucked into the interior of the casing 3 through the intake port 3k. The air sucked from the intake port 3k is blown out from the impeller 1 to the outside in the radial direction DR by the centrifugal force. The air blown out from the impeller 1 to the outside in the radial direction DR flows in the rotational direction R1 as the impeller 1 rotates.

The lower wall 32 faces the upper wall 31 in the axial direction DA. The motor 2 is fixed to the lower wall 32.

The side wall 33 connects the upper wall 31 and the lower wall 32. The side wall 33 has an exhaust port 3h. The exhaust port 3h opens in a direction crossing the axial direction DA. In the present example embodiment, the exhaust port 3h opens in a direction orthogonal to the axial direction DA.

The side wall 33 has a first side wall 331 and a second side wall 332. In the present example embodiment, the side wall 33 also includes a third side wall 333.

The first side wall 331 is connected to the second side wall 332 via the third side wall 333. The shape of the third side wall 333 as viewed in the axial direction DA is a substantially arc shape.

The second side wall 332 is disposed in parallel with the first side wall 331. The second side wall 332 is disposed downstream in the rotational direction R1 of the impeller 1 relative to the first side wall 331, via the exhaust port 3h.

The tongue portion 34 extends from the second side wall 332 toward the first side wall 331. Hereinafter, an end on the second side wall 332 side of the tongue portion 34 is referred to as a "base end", and an end on the first side wall 331 side of the tongue portion 34 is referred to as a "tip". A portion of the air that has flowed in the rotational direction R1 flows along the shape of the tongue portion 34.

Figure 3:
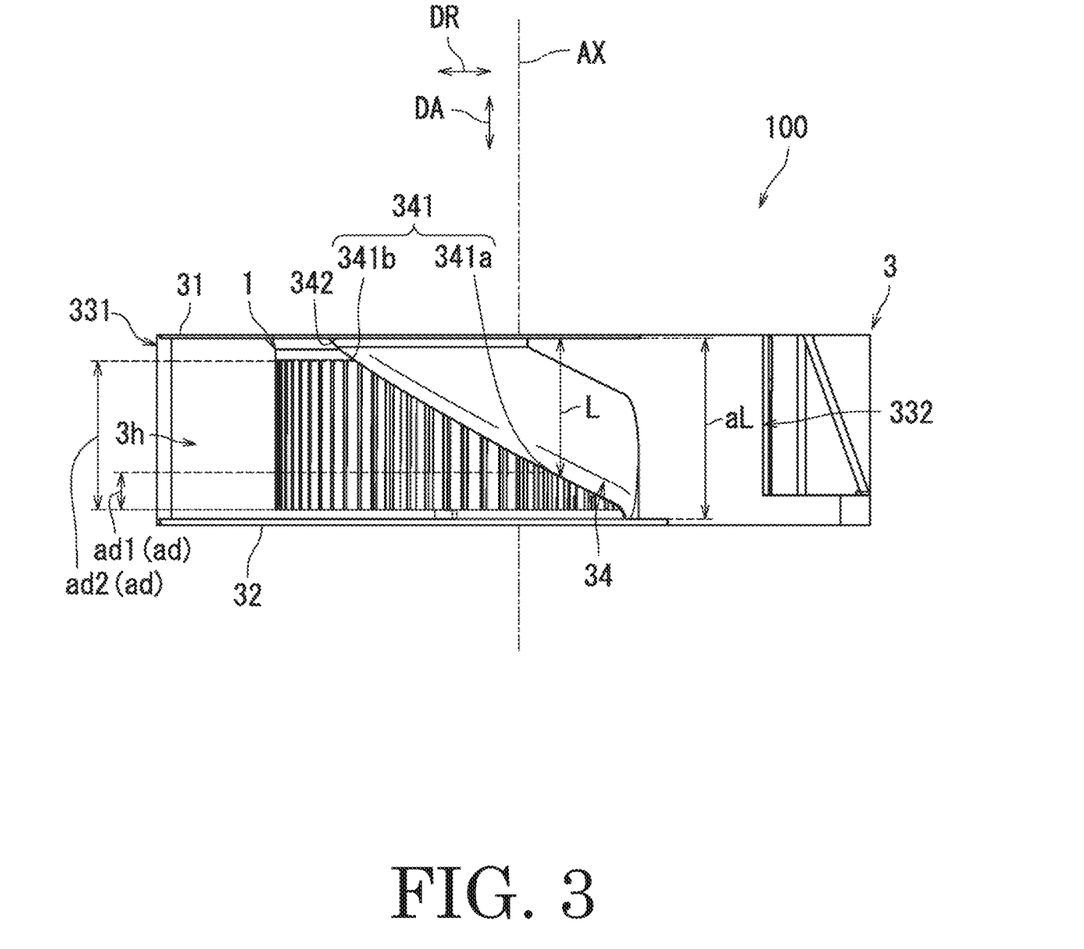
FIG. 3 is a side view showing the configuration of the blower apparatus according to the first example embodiment of the present disclosure.

Next, a configuration of the tongue portion 34 according to the first example embodiment of the present disclosure will be described with reference to FIG. 3. FIG. 3 is a side view showing the configuration of the blower apparatus 100 according to the first example embodiment of the present disclosure. Specifically, FIG. 3 shows the exhaust port 3h side of the blower apparatus 100.

As shown in FIG. 3, when the blower apparatus 100 is viewed from the exhaust port 3h side, the base end of the tongue portion 34 is positioned downstream (right side of FIG. 3) in the rotational direction R1 of the impeller 1 relative to the center axis AX.

The tongue portion 34 has a lower portion 341 and an upper portion 342. The lower portion 341 faces the lower wall 32 in the axial direction DA. The lower portion 341 has a first lower portion 341a and a second lower portion 341b. That is, the tongue portion 34 has the lower portion 341 facing the lower wall 32. In other words, the tongue portion 34 extends from the second side wall 332 toward the first side wall 331, and has the lower portion 341 facing the lower wall 32. The first lower portion 341a is provided downstream in the rotational direction R1 of the impeller 1 relative to the second lower portion 341b. In other words, the first lower portion 341a is provided on the base end side of the tongue portion 34, and the second lower portion 341b is provided on the tip side of the tongue portion 34. That is, the lower portion 341 has the first lower portion 341a on the substrate side, and the second lower portion 341b on the tip side.

A distance ad between the lower portion 341 and the lower wall 32 is different between the base end side and the tip side. In other words, a distance ad1 between the first lower portion 341a and the lower wall 32 is different from a distance ad2 between the second lower portion 341b and the lower wall 32. Specifically, the distance ad1 between the first lower portion 341a and the lower wall 32 is shorter than the distance ad2 between the second lower portion 341b and the lower wall 32. Hereinafter, the distance ad between the lower portion 341 and the lower wall 32 is referred to as "axial distance ad". In addition, the distance ad1 between the first lower portion 341a and the lower wall 32 may be referred to as "first axial distance ad1". Further, the distance ad2 between the second lower portion 341b and the lower wall 32 may be referred to as "second axial distance ad2". The axial distance ad includes the first axial distance ad1 and the second axial distance ad2.

The tongue portion 34 is connected to the upper wall 31. Specifically, the upper portion 342 is connected to the upper wall 31 in a state where the upper wall 31 is attached to the side wall 33. More specifically, the entire upper surface of the upper portion 342 contacts a portion of the lower surface of the upper wall 31. The upper portion 342 may be the same member integrally formed with the upper wall 31.

The impeller 1 according to the present example embodiment sucks air from the intake port 3k formed in the upper wall 31 when it rotates. Therefore, inside the casing 3, the flow of air becomes faster as it goes downward. In other words, inside the casing 3, the flow of air becomes slower as it goes upward.

Further, the air sucked into the interior of the casing 3 from the intake port 3k is blown out from the impeller 1 to the outside in the radial direction DR by the centrifugal force. Therefore, inside the casing 3, the flow of air becomes faster as it goes toward the side wall 33. The air blown out from the impeller 1 to the outside in the radial direction DR flows in the rotational direction R1 (along the side wall 33). Therefore, the flow of air in the vicinity of the exhaust port 3h becomes faster toward the first side wall 331 and the lower wall 32. In other words, the flow of air in the vicinity of the exhaust port 3h becomes slower toward the second side wall 332 and the upper wall 31. When the flow of air is slow, rotation of the impeller 1 facilitates the flow of part of the air toward the inside in the radial direction DR. Therefore, in the configuration in which the tongue portion 34 is not provided, the air near the exhaust port 3h tends to flow inward in the radial direction DR as it goes toward the second side wall 332 and the upper wall 31. Hereinafter, the flow of air inward in the radial direction DR is referred to as "backflow".

In the present example embodiment, the tongue portion 34 is provided in the vicinity of the exhaust port 3h. Specifically, the tongue portion 34 is connected at its upper portion 342 to the upper wall 31, and extends from the second side wall 332 toward the first side wall 331. Further, in the tongue portion 34, the distance ad1 (first axial distance ad1) between the first lower portion 341a and the lower wall 32 is shorter than the distance ad2 (second axial distance ad2) between the second lower portion 341b and the lower wall 32. That is, the tongue portion 34 is provided at a portion where backflow tends to occur in the vicinity of the exhaust port 3h in the configuration not having the tongue portion 34. Therefore, occurrence of a turbulent flow in the vicinity of the exhaust port 3h can be suppressed. As a result, noise can be reduced.

Moreover, the tongue portion 34 according to the present example embodiment is provided at a location where backflow tends to occur. Therefore, even when the tongue portion 34 is provided, reduction in the air volume can be suppressed. Therefore, the blower apparatus 100 can achieve noise reduction while suppressing a decrease in the air volume.

In the present example embodiment, a length L of the tongue portion 34 in the axial direction DA decreases toward the tip of the tongue portion 34. In other words, the distance ad (axial distance ad) between the lower portion 341 and the lower wall 32 increases toward the tip of the tongue portion 34. In the present example embodiment, the lower portion 341 is an upward slope that becomes higher toward the tip of the tongue portion 34.

The tip of the tongue portion 34 is located upstream in the rotational direction R1 of the impeller 1 relative to the base end of the tongue portion 34. That is, the tip of the tongue portion 34 is located on the upstream side of the air flow than the base end of the tongue portion 34. Therefore, as the axial distance ad increases toward the tip of the tongue portion 34, it is possible to suppress an abrupt increase in the pressure of air colliding with the tongue portion 34.

The distance ad1 between the first lower portion 341a and the lower wall 32 is shorter than a length aL of the base end of the tongue portion 34 in the axial direction DA. The distance ad1 between the first lower portion 341a and the lower wall 32 corresponds to the first axial distance ad1. Since the distance ad1 between the first lower portion 341a and the lower wall 32 is shorter than the length aL of the base end of the tongue portion 34 in the axial direction DA, the air near the exhaust port 3h easily flows along the tongue portion 34. Therefore, occurrence of a turbulent flow is further suppressed.

Figure 4:
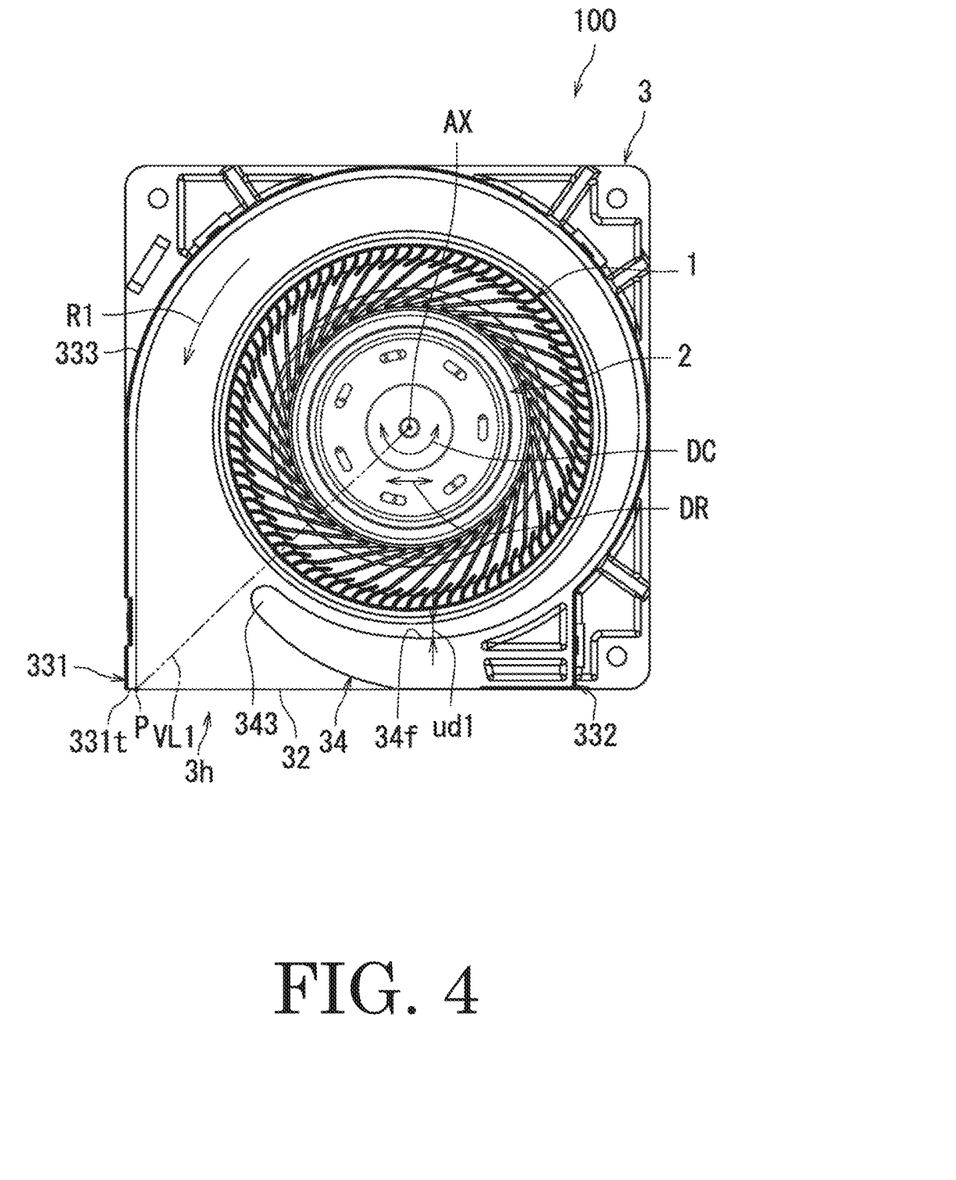
FIG. 4 is a plan view showing the configuration of the blower apparatus, shown in FIG. 1, in which an upper wall is removed.

Next, with reference to FIG. 4, the configuration of the tongue portion 34 according to the first example embodiment of the present disclosure will be further described. FIG. 4 is a plan view showing the configuration of the blower apparatus 100, shown in FIG. 1, in which the upper wall 31 is removed.

As shown in FIG. 4, the tongue portion 34 extends along the circumferential direction DC. The outer peripheral surface and the inner peripheral surface of the tongue portion 34 are curved surfaces. As described with reference to FIGS. 1 and 2, the air blown out from the impeller 1 to the outside in the radial direction DR flows in the rotational direction R1. In other words, the tongue portion 34 extends in a direction along the air flow. Since the tongue portion 34 extends in the direction along the air flow, the air easily flows along the tongue portion 34. As a result, occurrence of a turbulent flow is suppressed.

In the example shown in FIG. 4, the tongue portion 34 extends along the circumferential direction DC from the downstream side in the rotational direction R1 of the impeller 1 relative to a virtual line VL1. In other words, the base end of the tongue portion 34 is disposed downstream in the rotational direction R1 of the impeller 1 relative to the virtual line VL1. The virtual line VL1 is a line linking the center axis AX and an end point P. The end point P is an end point of a first exhaust port-side end portion 331t. The first exhaust port-side end portion 331t is an end portion, of the two end portions of the first side wall 331, opposite to the end portion connected to the third side wall 333, in the direction orthogonal to the axial direction DA. In other words, the first exhaust port-side end portion 331t is an end portion on the exhaust port 3h side of the first side wall 331. That is, the virtual line VL1 is a line linking the first exhaust port-side end portion 331t and the center axis AX. In the example shown in FIG. 4, the end point P is an end point on the exhaust port 3h side (inner side of the casing 3) of the first exhaust port-side end portion 331t.

In the configuration not having the tongue portion 34, backflow tends to occur on the downstream side in the rotational direction R1 of the impeller 1 relative to the virtual line VL1. Therefore, since the base end of the tongue portion 34 is located downstream in the rotational direction R1 of the impeller 1 relative to the virtual line VL1, occurrence of a turbulent flow is suppressed.

The tongue portion 34 also has a first opposed surface 34*f*. The first opposed surface 34*f* is formed of an inner wall surface in the radial direction DR of the tongue portion 34. The first opposed surface 34*f* opposes the impeller 1 in the radial direction DR. In the present example embodiment, a distance ud1 between the first opposed surface 34*f* and the impeller 1 is a certain distance. Hereinafter, the distance between the first opposed surface 34*f* and the impeller 1 may be referred to as "first radial distance ud1". In other words, the first radial distance ud1 between the first opposed surface 34*f* and the impeller 1 is constant in the circumferential direction DC. When the first radial distance ud1 is smaller than a certain distance, the pressure of the air colliding with the first opposed surface 34*f* of the tongue portion 34 is high, and sound is easily generated. On the other hand, when the first radial distance ud1 is larger than a certain distance, backflow easily occurs. In the present example embodiment, the first radial distance ud1 is a certain distance, and is constant in the circumferential direction DC. In other words, the first radial distance ud1 is constant from the tip to the base end of the tongue portion 34. As a result, occurrence of a turbulent flow is suppressed while reducing noise.

The tongue portion 34 also has a tip portion 343. The second lower portion 341*b* described with reference to FIG. 3 is configured of a lower portion of the tip portion 343.

The shape of the tip portion 343 is a substantially arc shape in top view. In other words, the shape of the tip portion 343 of the tongue portion 34 when viewed from the axial direction DA is an arc shape. Thereby, the blower apparatus 100 can disperse the pressure of the air colliding with the tongue portion 34. As a result, noise can be reduced.

Figure 5:
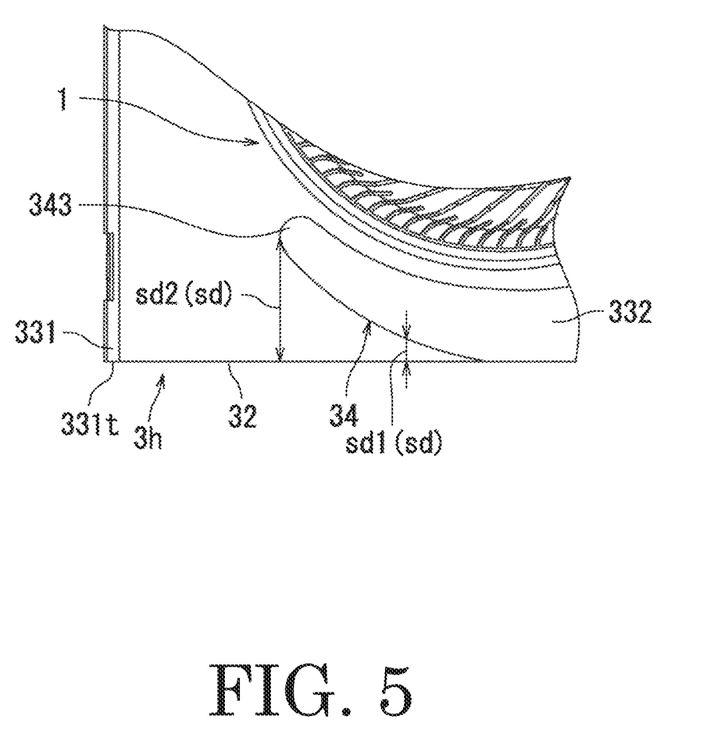
FIG. 5 is a diagram showing a configuration of the tongue portion and the vicinity thereof that are shown in FIG. 4.

Next, with reference to FIG. 5, a relationship between the tongue portion 34 and the exhaust port 3*h* according to the first example embodiment of the present disclosure will be described. FIG. 5 is a diagram showing the configuration of the tongue portion 34 and the vicinity thereof that are shown in FIG. 4.

As shown in FIG. 5, a distance sd between the tongue portion 34 and the exhaust port 3*h* when viewed in the axial direction DA differs between the base end side of the tongue portion 34 and the tip side of the tongue portion 34. Specifically, the distance sd1 between the exhaust port 3*h* and the base end side of the tongue portion 34 is shorter than the distance sd2 between the exhaust port 3*h* and the tip side of the tongue portion 34. Hereinafter, the distance sd between the tongue portion 34 and the exhaust port 3*h* when viewed in the axial direction DA is referred to as "inter-exhaust port distance sd". Further, the distance sd1 between the exhaust port 3*h* and the base end side of the tongue portion 34 when viewed from the axial direction DA is referred to as "first inter-exhaust port distance sd1", and the distance sd2 between the exhaust port 3*h* and the tip side of the tongue portion is referred to as "second inter-exhaust port distance sd2". The inter-exhaust port distance sd includes the first inter-exhaust port distance sd1 and the second inter-exhaust port distance sd2.

Since the first inter-exhaust port distance sd1 is shorter than the second inter-exhaust port distance sd2, the air near the exhaust port 3*h* can easily flow along the tongue portion 34. As a result, occurrence of a turbulent flow in the vicinity of the exhaust port 3*h* is suppressed.

In the example shown in FIG. 5, the distance sd between the tongue portion 34 and the exhaust port 3*h* increases toward the tip of the tongue portion 34. The distance sd between the tongue portion 34 and the exhaust port 3*h* corresponds to the inter-exhaust port distance sd. As the distance sd between the tongue portion 34 and the exhaust port 3*h* increases toward the tip of the tongue portion 34, the air near the exhaust port 3*h* easily flows along the tongue portion 34. Therefore, occurrence of a turbulent flow in the vicinity of the exhaust port 3*h* is further suppressed.

Next, the configuration of the tongue portion 34 according to the first example embodiment of the present disclosure will be further described with reference to FIGS. 6 and 7.

Figure 6:
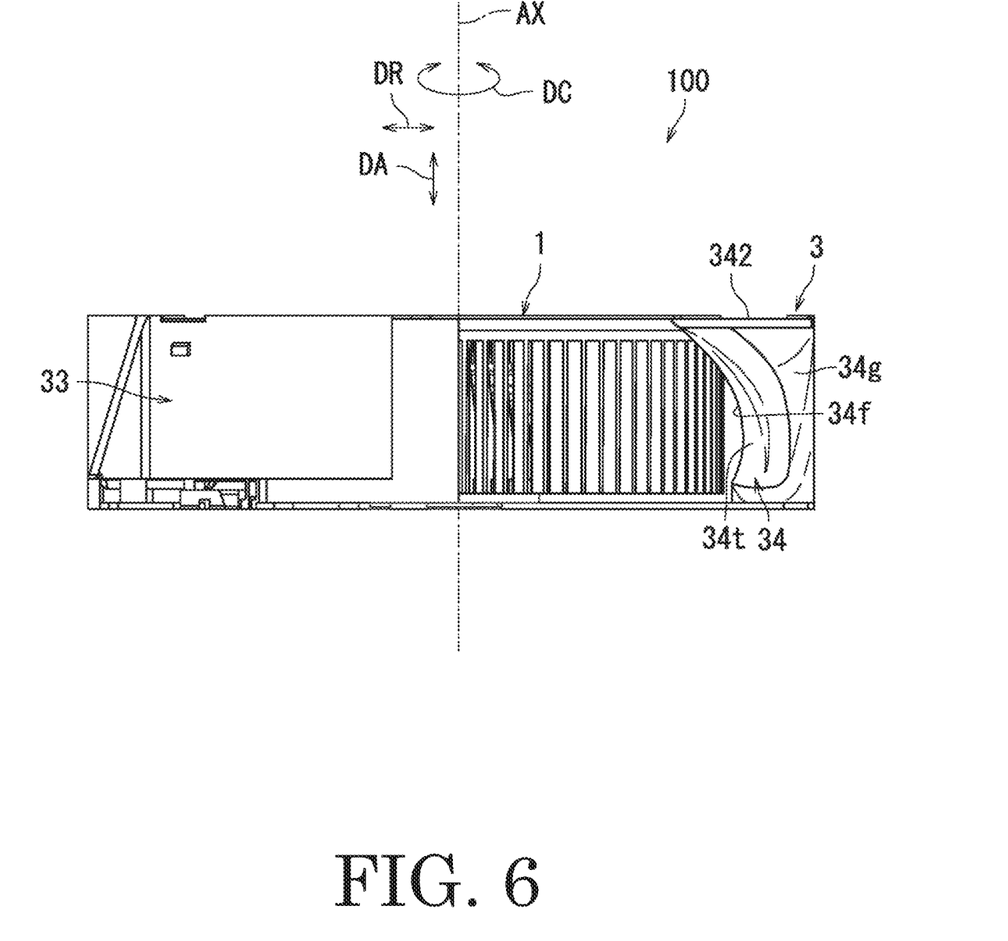
FIG. 6 is a diagram showing the configuration of the tongue portion according to the first example embodiment of the present disclosure.

FIG. 6 is a diagram showing the configuration of the tongue portion 34 according to the first example embodiment of the present disclosure. Specifically, FIG. 6 is a side view of the blower apparatus 100 in which a part of the side wall 33 is omitted. In addition, the upper wall 31 is omitted in FIG. 6 in order to facilitate understanding. FIG. 7 is a schematic cross-sectional view showing the configuration of the tongue portion 34 and the vicinity thereof according to the first example embodiment of the present disclosure. More specifically, FIG. 7 is a cross-sectional view of the tongue portion 34 taken along a direction parallel to the first side wall 331, as viewed from the first side wall 331 side. In FIG. 7, the upper wall 31 is indicated by a two-dot chain line in order to facilitate understanding.

Figure 7:
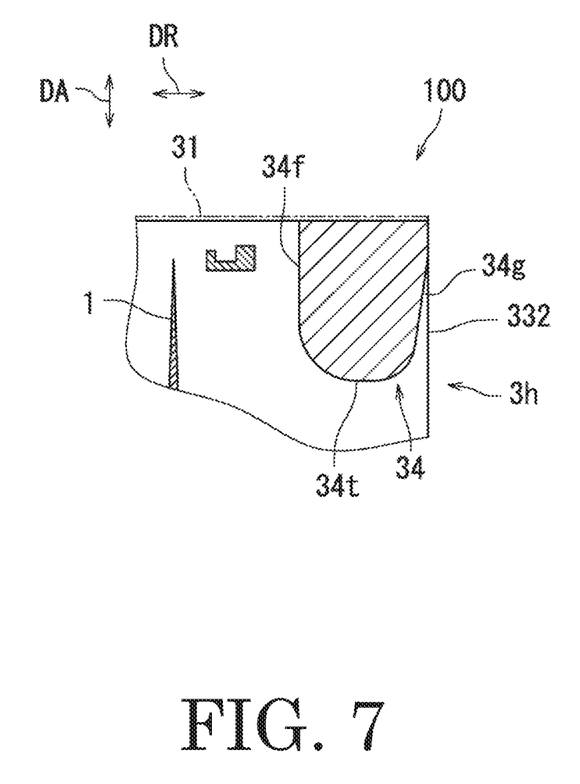
FIG. 7 is a cross-sectional view schematically showing the configuration of the tongue portion and the vicinity thereof according to the first example embodiment of the present disclosure.

As shown in FIGS. 6 and 7, the tongue portion 34 has a radially outer surface 34*g*. Specifically, the tongue portion 34 further has a lower end surface 34*t* and the radially outer surface 34*g*. The shape of the lower end surface 34*t* is a substantially arc shape in a sectional view. The lower end surface 34*t* is connected to the first opposed surface 34*f* and the radially outer surface 34*g*.

The first opposed surface 34*f* extends along the axial direction DA. The first opposed surface 34*f* is parallel to the axial direction DA.

The radially outer surface 34*g* is formed of the outer wall surface in the radial direction DR of the tongue portion 34. The radially outer surface 34*g* approaches the center axis AX as being separated from the upper wall 31. As a result, the air near the exhaust port 3*h* can easily flow along the radially outer surface 34*g* of the tongue portion 34. Therefore, occurrence of a turbulent flow in the vicinity of the exhaust port 3*h* is suppressed. Specifically, in the case where the radially outer surface 34*g* extends along the axial direction DA, a turbulent flow may be caused by the air flowing out through the gap in the axial direction DA between the lower portion 341 and the lower wall 32 in the vicinity of the radially outer surface 34*g*. According to the present example embodiment, the air near the exhaust port 3*h* flows along the radially outer surface 34*g*. Therefore, occurrence of a turbulent flow in the vicinity of the radially outer surface 34*g* can be suppressed.

The first example embodiment has been described above. The tongue portion 34 is provided at a position where backflow tends to occur in the vicinity of the exhaust port 3*h* in the configuration not having the tongue portion 34. Therefore, according to the present example embodiment, it is possible to suppress occurrence of a turbulent flow in the vicinity of the exhaust port 3*h*. In addition, the tongue portion 34 is provided at a position where backflow tends to occur. Therefore, according to the present example embodiment, a decrease in the air volume is suppressed. Thus, the blower apparatus 100 can achieve noise reduction while suppressing a decrease in the air volume.

In the present example embodiment, the configuration in which the lower portion 341 is inclined upward toward the tip of the tongue portion 34 has been described. However, the lower portion 341 may be in a stepped shape in which it becomes higher toward the tip of the tongue portion 34.

Moreover, although the configuration in which the outer peripheral surface of the tongue portion 34 and the inner peripheral surface of the tongue portion 34 are curved surfaces has been described in the present example embodiment, the outer peripheral surface of the tongue portion 34 may be in a stepped shape. Similarly, the inner circumferential surface of the tongue portion 34 may be in a stepped shape.

Figure 8:
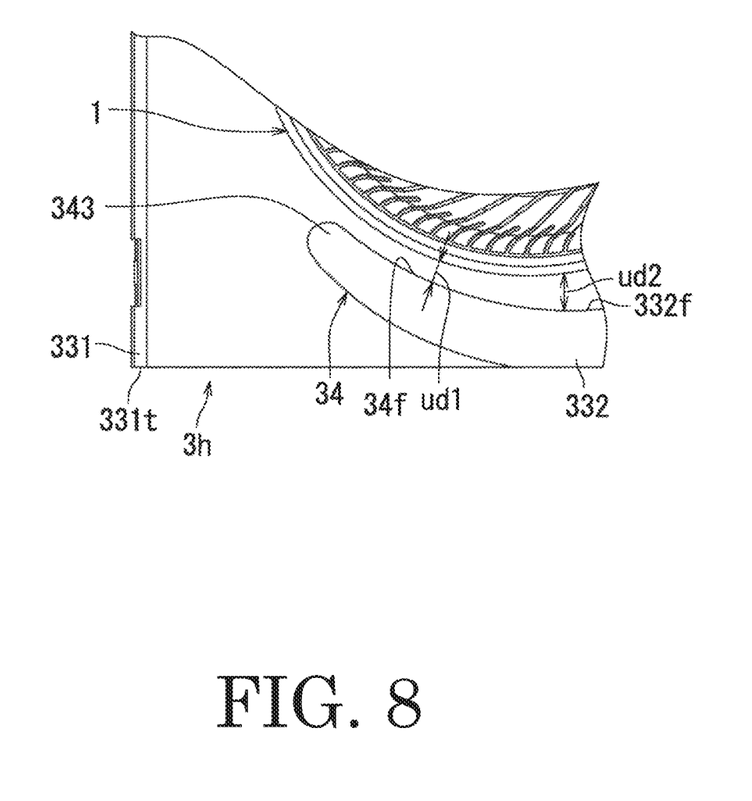
FIG. 8 is a diagram showing another configuration of the tongue portion and the vicinity thereof according to the first example embodiment of the present disclosure.

Further, in the present example embodiment, the configuration in which the first radial distance ud1 between the first opposed surface 34f and the impeller 1 is constant has been described. However, the first radial distance ud1 may not be constant. For example, as shown in FIG. 8, the first radial distance ud1 may be longer toward the downstream side in the rotational direction R1 of the impeller 1. FIG. 8 is a diagram showing another configuration of the tongue portion 34 and the vicinity thereof according to the first example embodiment of the present disclosure.

As shown in FIG. 8, in the configuration in which the first radial distance ud1 increases toward the downstream side in the rotational direction R1 of the impeller 1, the second side wall 332 may be separated from the impeller 1 toward the downstream side in the rotational direction R1 of the impeller 1. Specifically, the second side wall 332 has a second opposed surface 332f. The second opposed surface 332f faces the impeller 1 in the radial direction DR. The second radial distance ud2 between the second opposed surface 332f and the impeller 1 may be longer toward the downstream side in the rotational direction R1 of the impeller 1. In other words, the first radial distance ud1 and the second radial distance ud2 may be longer toward the downstream side in the rotational direction R1 of the impeller 1. As the first radial distance ud1 and the second radial distance ud2 increase, it is possible to suppress that the air, flowing in the vicinity of the tip portion 343, flows toward the inner side in the radial direction RD relative to the first opposed surface 34f. Further, the flow path of the air blown out from the impeller 1 can be expanded on the downstream side in the rotational direction R1 of the impeller 1 relative to the tip portion 343. Specifically, the flow passage of the air blown out from the impeller 1, on the inner side in the radial direction DR relative to the second opposed surface 332f, can be expanded. As a result, the blower apparatus 100 can achieve noise reduction.

Figure 9:
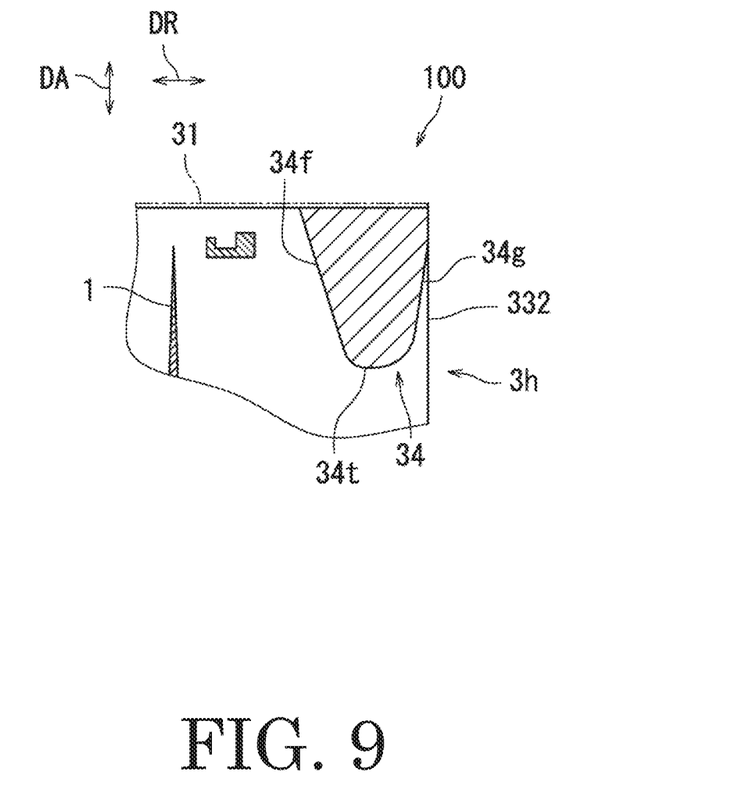
FIG. 9 is a schematic cross-sectional view showing still another configuration of the tongue portion and the vicinity thereof according to the first example embodiment of the present disclosure.

Further, in the present example embodiment, the configuration in which the first opposed surface 34f of the tongue portion 34 is parallel to the axial direction DA has been described. However, the first opposed surface 34f may not be parallel to the axial direction DA. For example, as shown in FIG. 9, the first opposed surface 34f may be separated from the center axis AX as being separated from the upper wall 31. FIG. 9 is a schematic cross-sectional view showing still another configuration of the tongue portion 34 and the vicinity thereof according to the first example embodiment of the present disclosure. In FIG. 9, the upper wall 31 is indicated by a two-dot chain line in order to facilitate understanding. Since the first opposed surface 34f is separated from the center axis AX as being separated from the upper wall 31, the pressure of air colliding with the lower end surface 34t of the tongue portion 34 can be relieved. Therefore, noise can be reduced.

Figure 10:
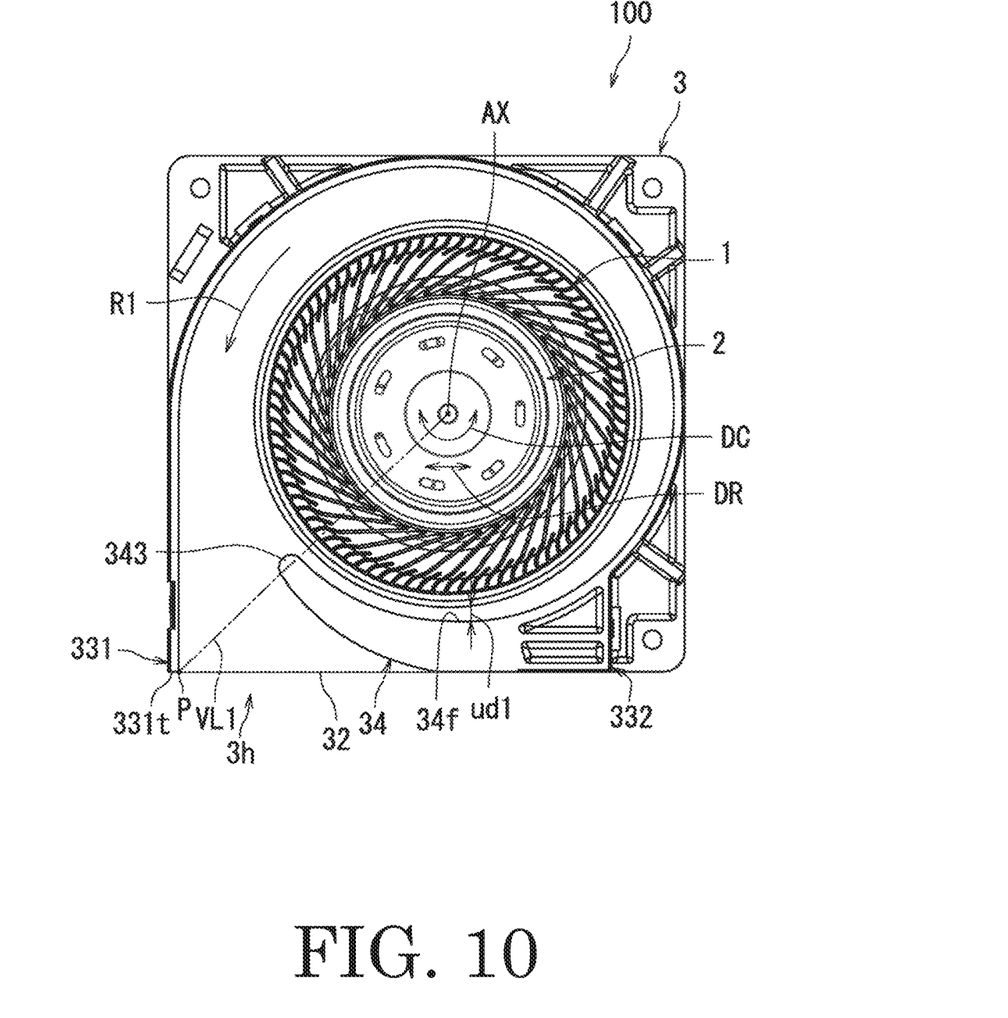
FIG. 10 is a plan view showing another configuration of the blower apparatus according to the first example embodiment of the present disclosure.

FIG. 10 is a plan view showing another configuration of the blower apparatus 100 according to the first example embodiment of the present disclosure. As shown in FIG. 10, the tip of the tongue portion 34 may be disposed upstream in the rotational direction R1 of the impeller 1 relative to the virtual line VL1. Thereby, the length of the circumferential direction DC of the tongue portion 34 can be longer. As a result, the air blown out from the impeller 1 can be guided to the exhaust port 3h in a wider range. Thus, occurrence of a turbulent flow is further suppressed.

In the present example embodiment, the case where the end point P is an end point of the exhaust port 3h side (the inner side of the casing 3) of the first exhaust port-side end portion 331t has been described. However, the end point P may be an end point, in the first exhaust port-side end portion 331t, on the opposite side (outside of the casing 3) to the exhaust port 3h of the first exhaust port-side end portion 331t.

Second Example Embodiment

Next, an automotive air conditioner 200 according to a second example embodiment of the present disclosure will be described with reference to FIG. 11.

Figure 11:
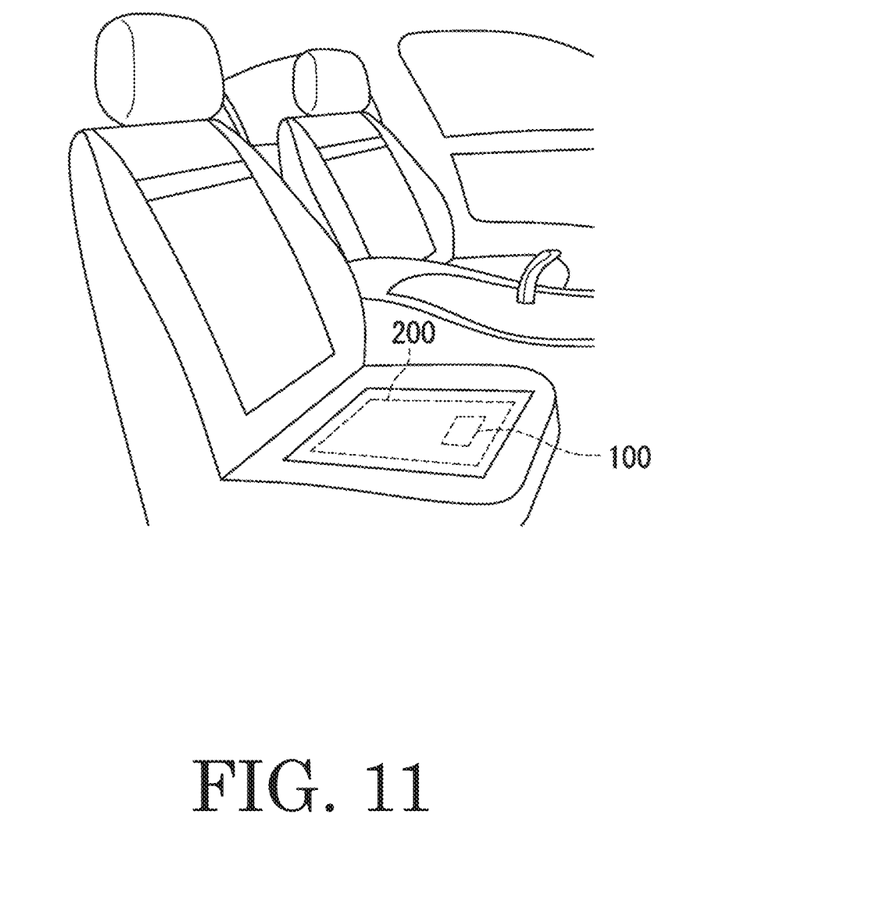
FIG. 11 is a diagram showing an automotive air conditioner according to a second example embodiment of the present disclosure.

FIG. 11 is a diagram showing the automotive air conditioner 200 according to the second example embodiment of the present disclosure.

As shown in FIG. 11, the automotive air conditioner 200 includes the blower apparatus 100. The automotive air conditioner 200 is embedded in a seat mounted on a vehicle, for example. In that case, the air flows between the seat and a person sitting on the seat. This allows the person sitting on the seat to feel the wind.

The second example embodiment has been described above. The blower apparatus 100 according to the present example embodiment can achieve noise reduction while suppressing a decrease in the air volume. Therefore, a person sitting on a seat can spend a comfortable time.

The example embodiments of the present disclosure have been described above with reference to the drawings (FIGS. 1 to 11). However, the present disclosure is not limited to the example embodiments described above, and can be implemented in various modes without departing from the scope of the present disclosure. The configurations and the numerical values shown in the above-described example embodiments are merely examples and are not particularly limited, and various modifications can be made within the scope not substantially departing from the effects of the present disclosure.

The present disclosure is suitably applicable to a blower apparatus. In addition, the present disclosure is suitably applicable to an automotive air conditioner, for example.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A blower apparatus comprising:
an impeller rotatable about a center axis extending in an up-and-down direction;
a motor to rotate the impeller; and
a casing that accommodates the impeller; wherein
the casing includes:
an upper wall including an intake port that opens in an axial direction;
a lower wall opposed to the upper wall in the axial direction;
a side wall that connects the upper wall and the lower wall, and includes an exhaust port that opens in a cross direction crossing the axial direction; and
a tongue portion connected to the upper wall;
the side wall includes:
a first side wall; and a second side wall disposed downstream in a rotational direction of the impeller relative to the first side wall via the exhaust port;

the tongue portion extends from the second side wall toward the first side wall, and includes a lower portion opposed to the lower wall;

the lower portion includes a first lower portion on a base end side and a second lower portion on a tip side; and a distance between the first lower portion and the lower wall is shorter than a distance between the second lower portion and the lower wall.

2. The blower apparatus according to claim 1, wherein a distance between the lower portion and the lower wall increases toward a tip of the tongue portion.

3. The blower apparatus according to claim 1, wherein the distance between the first lower portion and the lower wall is shorter than a length of a base end of the tongue portion in the axial direction.

4. The blower apparatus according to claim 1, wherein the tongue portion extends along a circumferential direction.

5. The blower apparatus according to claim 1, wherein
the tongue portion includes a first opposed surface that is opposed to the impeller in a radial direction; and
a radial distance between the first opposed surface and the impeller is constant or substantially constant in a circumferential direction.

6. The blower apparatus according to claim 1, wherein
the tongue portion includes a first opposed surface that is opposed to the impeller in a radial direction;
the second side wall includes a second opposed surface that is opposed to the impeller in the radial direction;
a first radial distance between the first opposed surface and the impeller increases toward a downstream side in the rotational direction of the impeller; and
a second radial distance between the second opposed surface and the impeller increases toward the downstream side in the rotational direction of the impeller.

7. The blower apparatus according to claim 6, wherein the first opposed surface is separated from the center axis and the upper wall.

8. The blower apparatus according to claim 1, wherein a shape of a tip portion of the tongue portion when viewed in the axial direction is a circular arc shape.

9. The blower apparatus according to claim 1, wherein a distance between the exhaust port and the base end side of the tongue portion is shorter than a distance between the exhaust port and the tip side of the tongue portion.

10. The blower apparatus according to claim 1, wherein a distance between the tongue portion and the exhaust port increases toward a tip of the tongue portion.

11. The blower apparatus according to claim 1, wherein
the tongue portion includes a radially outer surface; and
the radially outer surface approaches the center axis as being separated from the upper wall.

12. The blower apparatus according to claim 1, wherein a base end of the tongue portion is disposed downstream in the rotational direction of the impeller relative to a virtual line linking an end portion on an exhaust port side of the first side wall and the center axis.

13. The blower apparatus according to claim 1, wherein a tip of the tongue portion is disposed on an upstream side in the rotational direction of the impeller relative to a virtual line linking an end portion on an exhaust port side of the first side wall and the center axis.

14. An automotive air conditioner comprising the blower apparatus according to claim 1.

* * * * *